US009237752B2

(12) United States Patent
Powell

(10) Patent No.: US 9,237,752 B2
(45) Date of Patent: Jan. 19, 2016

(54) LAMINATED BAKING MOLD

(75) Inventor: G. Douglas Powell, Richmond, VA (US)

(73) Assignee: Reynolds Consumer Products Inc., Richmond, VA (US)

( * ) Notice: Subject to any disclaimer, the term of this patent is extended or adjusted under 35 U.S.C. 154(b) by 975 days.

(21) Appl. No.: 12/461,177

(22) Filed: Aug. 4, 2009

(65) Prior Publication Data

US 2011/0031375 A1    Feb. 10, 2011

(51) Int. Cl.
*A21B 3/13* (2006.01)
*A47J 43/20* (2006.01)

(52) U.S. Cl.
CPC ... *A21B 3/13* (2013.01); *A47J 43/20* (2013.01)

(58) Field of Classification Search
CPC ....... A47J 27/002; A47J 36/02; A47J 36/025; A47J 37/01; A47J 43/20; B32B 1/02; B32B 2439/00; B32B 15/043; B32B 2255/06; A21B 3/13; A21B 3/131; A21B 3/133; A21B 3/134; B65D 25/14; B65D 25/02; B65D 25/20
USPC .............. 249/112–113, 114.1–116, 117, 120, 249/127, 134, 135, DIG. 1; 220/573.1, 220/573.2; 99/426, 450–450.2, DIG. 15; 229/5.81–5.85; 428/34.1, 34.2, 34.8
See application file for complete search history.

(56) References Cited

U.S. PATENT DOCUMENTS

| 2,027,296 | A | * | 1/1936 | Stuart et al. | ................. 206/524.6 |
| 2,125,793 | A | | 8/1938 | Linderman | |
| 2,170,040 | A | | 8/1939 | Stuart | |
| 2,242,684 | A | | 5/1941 | Stuart | |
| 2,778,760 | A | * | 1/1957 | Hurst | ............................ 428/337 |
| 3,013,900 | A | * | 12/1961 | Yezek et al. | ................... 427/362 |
| 3,327,921 | A | | 6/1967 | Baughan | |
| 3,355,348 | A | | 11/1967 | Lamar | |
| 3,411,433 | A | | 11/1968 | Christopher | |
| 3,507,668 | A | | 4/1970 | Bridgford | |
| 3,640,209 | A | | 2/1972 | Wilson | |
| 3,681,117 | A | * | 8/1972 | Jolly et al. | ..................... 428/463 |

(Continued)

FOREIGN PATENT DOCUMENTS

| CN | 200961016 | * | 10/2007 | ............. B65D 65/40 |
| JP | 2004-17984 A | * | 1/2004 | ............. B65D 65/40 |

(Continued)

OTHER PUBLICATIONS

Translation of JP 2004-17984 A; and CN 200961016.*

(Continued)

*Primary Examiner* — Yogendra Gupta
*Assistant Examiner* — Leith S Shafi
(74) *Attorney, Agent, or Firm* — Greenberg Traurig, LLP

(57) ABSTRACT

A laminated baking mold material includes a food contact layer and an exterior layer. The food contact layer serves as a functional layer, and may include an aluminum foil. The exterior layer may include a paper layer, and may be printed. The laminated baking mold may be formed into self-supporting baking molds or pan-supported baking liners. The functional barrier prevents migration of ink from an exterior surface of the baking mold or liner into a baked product or the permeation of grease or moisture from the baked product to the exterior layer preventing a degradation of a printing thereon and allowing for deep, opaque, and vibrant colors and patterns.

37 Claims, 5 Drawing Sheets
(2 of 5 Drawing Sheet(s) Filed in Color)

(56) References Cited

U.S. PATENT DOCUMENTS

| | | | |
|---|---|---|---|
| 3,734,749 A | 5/1973 | Bridgford | |
| 3,796,174 A | 3/1974 | Wilson | |
| 4,196,841 A * | 4/1980 | Smith et al. | 229/123.2 |
| 4,604,635 A * | 8/1986 | Wiklof et al. | 503/226 |
| 4,841,112 A | 6/1989 | Peleg | |
| 4,943,439 A | 7/1990 | Andreas et al. | |
| 4,943,456 A | 7/1990 | Pollart et al. | |
| 5,132,144 A | 7/1992 | Parks | |
| 5,203,491 A | 4/1993 | Marx et al. | |
| 5,273,798 A | 12/1993 | Miner | |
| 5,334,404 A | 8/1994 | Garcia et al. | |
| 5,415,910 A * | 5/1995 | Knauf | 428/34.3 |
| 5,565,228 A | 10/1996 | Gics | |
| 5,585,156 A | 12/1996 | Fontana | |
| 5,613,427 A | 3/1997 | Wiley | |
| 5,626,929 A * | 5/1997 | Stevenson | 428/35.8 |
| 5,707,472 A | 1/1998 | Smith | |
| 6,184,510 B1 | 2/2001 | Zucker | |
| 6,270,003 B1 | 8/2001 | Hirano | |
| 7,201,358 B2 | 4/2007 | Nichols et al. | |
| 7,247,824 B1 | 7/2007 | Garavito | |
| 7,435,467 B2 | 10/2008 | Yang | |
| 2001/0043973 A1 | 11/2001 | Keck et al. | |
| 2002/0112614 A1 | 8/2002 | Zoss | |
| 2002/0155259 A1 | 10/2002 | Kume et al. | |
| 2004/0115401 A1 | 6/2004 | Talja et al. | |
| 2004/0154475 A1 | 8/2004 | Shaw | |
| 2005/0013951 A1 | 1/2005 | Mitchell et al. | |
| 2005/0211101 A1 | 9/2005 | Finnie, II | |
| 2005/0244599 A1 | 11/2005 | Molinari | |
| 2006/0068070 A1 * | 3/2006 | Nichols et al. | 426/512 |
| 2006/0251777 A1 | 11/2006 | Koplish | |
| 2007/0215678 A1 | 9/2007 | Swoboda et al. | |
| 2007/0292567 A1 * | 12/2007 | Kaas et al. | 426/106 |
| 2008/0003384 A1 | 1/2008 | Murphy et al. | |
| 2008/0118605 A1 | 5/2008 | Owen | |

FOREIGN PATENT DOCUMENTS

| | | | |
|---|---|---|---|
| JP | 2007/196406 A | 8/2007 | |
| JP | 2006/320615 A | 11/2008 | |
| WO | WO 9611578 A1 * | 4/1996 | A22C 13/00 |

OTHER PUBLICATIONS

Heat resistant wax properties, dupont/industrial polymer, Sep. 9, 2005, pp. 1-6.*

Product data sheet of 35TL Heavy Duty, published from Hamilton Technologies, Nov. 3, 2000, p. 1.*

Corrosion inhibitor packaging for metal, published/copyright on 2007 and pp. 1-12.*

* cited by examiner

LAMINATED BAKING MOLD

COPYRIGHT NOTIFICATION

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND OF THE DISCLOSURE

1. Field of the Invention

The present invention relates to a laminated baking mold, and more particularly to a laminated baking mold material usable to form self-supported baking molds and pan-supported baking liners.

2. Description of the Related Art

Generally, the production of individual-size baked products requires the use of specialized baking molds. For example, specialized baking pans are used for baking cupcakes. These cupcake pans are often made of metal and generally define six or twelve depressions or "cups" therein. The cups are filled with a batter and baked to produce cupcakes. Oven-proof baking pans may also be made of stoneware, silicone rubber, or other ovenable materials.

When baking pans are used, baking liners may be disposed in the baking pan to receive the batter and facilitate removal of the product once baked. Additionally, the liners allow for easier handling of the baked product and facilitates cleaning of the baking pan. Another advantage of a baking liner is that the liner may, typically, be easily peeled away from the finished baked product.

The baking liners are usually made of a thin sheet of paper or aluminum pressed into a round, fluted cup shape, which require the support of the baking pan to hold the batter during baking. However, when two or three liners are nested together, or when liners are made from thicker paper or aluminum sheets, the liners may become sufficiently rigid to support the batter during the cooking process without the use of a baking pan. These self-supporting baking liners can then be used as individual self-supporting baking molds.

Whether the baking liners are used as self-supporting baking molds or as pan-supported baking liners, the liners are usually decorated or printed to improve an aesthetic appeal of the finished baked product. However, because these liners are used to handle food products, a type and an amount of ink used to print an exterior surface of the baking liner may be restricted. That is, food safety regulations may require extraction testing to determine a possible amount of ink that may transfer from the exterior surface of the baking mold or liner to the baked product during the baking process. The possibility of ink contamination not only limits the types of ink that can be used, but also pushes manufacturers to use small amounts of ink for printing. In the case of pan-supported liners made of thin paper, this leads to liners which are lightly printed, without deep, opaque, colors or vibrant patterns.

In addition, during the baking process, grease and moisture from the batter permeates through conventional liners to degrade an appearance of the liner. For example, FIGS. 1-3 illustrate a plurality of conventional baking liners [10] before a baking process [11] and the same baking liners [10] after the baking process [12]. As illustrated in FIGS. 1-3, during the baking process moisture and/or grease from the baking product batter permeates through the baking liners [12]. Accordingly, the baking liners [12] become somewhat translucent, and the original color of the conventional liners [10] indicated as [11] are instead affected by the color of the batter showing through the now translucent liners [12]. Furthermore, a color and/or design printed on the conventional baking liners [10] is similarly degraded during the baking process or obscured by the baking product showing through the baking liners [12].

Self-supporting baking molds can be made of aluminum. However, because ink printed on aluminum may have a tendency to "flake" off during baking or handling, these are also lightly printed, without deep, opaque colors or vibrant patterns.

Accordingly, there is a need for an inexpensive baking mold or liner material which can be printed with deep, vibrant, and opaque patterns. Further, there is a need for a baking mold or liner material which can provide a functional barrier to prevent ink from migrating from a printed surface of the baking mold or liner into the baked product. There is a further need for a method of manufacturing such self-supporting baking molds or pan-supported baking liners that is both inexpensive and easy to perform.

SUMMARY OF THE DISCLOSURE

The present invention provides a laminated baking mold material which can be printed with deep, opaque, and/or vibrant colors that are not degraded during a baking process.

The present invention also provides a laminated baking mold material which has a functional barrier to prevent migration of ink or other substances from a printed exterior of the baking mold into the baked product.

The present invention also provides for a laminated self-supporting baking mold or laminated pan-supported baking liner.

The present invention also provides for a method to manufacture the laminated baking mold or liner.

Additional aspects and advantages of the present invention will be set forth in part in the description which follows and, in part, will be obvious from the description, or may be learned by practice of the invention.

The foregoing and/or other aspects and utilities of the present invention may be achieved by providing a laminated material, including a food contact layer to contact a food product, and an exterior layer laminated to the food contact layer, wherein the food contact layer comprises a metal.

The metal may include aluminum foil, and the aluminum foil may be 0.00285 inches thick.

The contact layer may be between about 0.00025 and 0.0012 inch thick.

The exterior layer may include paper, and the exterior layer may include 35 lb paper.

The exterior layer may be between about a 15 lb tissue and a 50 lb paper.

The laminated material may further include an adhesive layer disposed between the food contact layer and the exterior layer to adhesively couple the food contact layer and the exterior layer.

The adhesive layer may include a non-toxic adhesive, and the adhesive layer may include about 0.75 to 1.25 lb of adhesive per 3000 sq ft of laminated material.

The exterior layer may be printed with an ink.

The laminated material may further include a seal layer disposed over the printed exterior layer.

The seal layer may include a heat resistant wax, and the heat resistant wax may be a food grade wax.

The seal layer may be applied as 4 lb per 3000 sq ft (ream).

The heat resistant wax may be one of the various waxes cleared for either direct food contact or as a direct food additive under various regulations found within 21 Code of Federal Regulations.

The laminated material may be formed into a self-supporting baking mold, the food contact layer is 0.00026 inches thick, and the exterior layer is a 35 lb paper.

The laminated material may be formed into a pan-supported liner, the food contact layer is 0.00026 inches thick, and the exterior layer is a 25 lb paper.

The food contact layer may serve as a functional barrier to prevent migration of the ink and adhesive into a food product contained in the self-supporting baking mold.

The food contact layer may serve as a functional barrier to prevent at least one of moisture and grease from migration into the exterior layer from a food product contained in the self-supporting baking mold.

The food contact layer may serve as a functional barrier to prevent migration of the ink and adhesive into a food product contained in the pan-supported liner.

The food contact layer may serve as a functional barrier to prevent at least one of moisture and grease from migration into the exterior layer from a food product contained in the pan-supported liner.

The foregoing and/or other aspects and utilities of the present invention may also be achieved by providing a laminated self-supporting baking mold, including a food contact layer to contact a food product, and an exterior layer laminated to the food contact layer, wherein the food contact layer comprises a metal.

The laminated self-supporting baking mold may further include an adhesive layer disposed between the food contact layer and the exterior layer to adhesively couple the food contact layer and the exterior layer.

An exterior surface of the laminated self-supporting baking mold may be printed with an ink, the laminated self-supporting baking mold may further include a seal layer disposed over the printed exterior surface.

The food contact layer may include aluminum foil, and the food contact layer may serve as a functional barrier to prevent migration of the ink and adhesive into the food product contained in the self-supporting baking mold and to prevent at least one of moisture and grease from migration into the exterior layer from the food product.

The food contact layer may be 0.00025 to 0.0012 inches thick, and the exterior layer may be a 15 lb tissue to a 50 lb paper.

The food contact layer may be coated with a lubricant.

The baking mold may be dimensioned to contain a food product volume of between about 1 to 12 fluid ounces.

The baking mold may be dimensioned to contain a food product volume of about 3.5 fluid ounces.

The foregoing and/or other aspects and utilities of the present invention may also be achieved by providing a laminated baking liner, including a food contact layer to contact a food product, and an exterior layer laminated to the food contact layer, wherein the food contact layer comprises a metal.

The laminated baking liner may further include an adhesive layer disposed between the food contact layer and the exterior layer to adhesively couple the food contact layer and the exterior layer.

An exterior surface of the laminated baking liner may be printed with an ink, the laminated baking liner may further include a seal layer disposed over the printed exterior surface.

The food contact layer may include aluminum foil, and the food contact layer may serve as a functional barrier to prevent migration of the ink and adhesive into the food product contained in the laminated baking liner and to prevent at least one of moisture and grease from migration into the exterior layer from the food product.

The food contact layer may be 0.00025 to 0.0012 inches thick, and the exterior layer may be a 15 lb tissue to a 50 lb paper.

The food contact layer may be coated with a lubricant.

The baking mold may be dimensioned to contain a food product volume of between about 1 to 12 fluid ounces.

The baking mold may be dimensioned to contain a food product volume of about 3.5 fluid ounces.

The foregoing and/or other aspects and utilities of the present invention may also be achieved by providing a laminated printed food wrap, including an exterior layer, having an outer surface thereof printed with an ink, a food contact layer to contact a food product, the food contact layer comprising a metal foil, and an adhesive layer disposed between the exterior layer and the food contact layer to adhesively couple the exterior layer and the food contact layer, wherein the food contact layer serves as a functional barrier to prevent migration of the ink and adhesive into a food product wrapped by the laminated printed food wrap and to prevent at least one of moisture and grease from migration into the exterior layer from the food product.

The laminated printed food wrap may further include a seal layer disposed over the printed exterior surface.

The foregoing and/or other aspects and utilities of the present invention may also be achieved by providing a baking container including a laminated self-supporting baking mold, including a food contact layer to contact a food product, and an exterior layer laminated to the food contact layer, wherein the food contact layer comprises a metal.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

The above and/or other aspects and advantages of the present invention will become apparent and more readily appreciated from the following description of the embodiments, taken in conjunction with the accompanying drawings of which.

DETAILED DESCRIPTION

Figure 1:
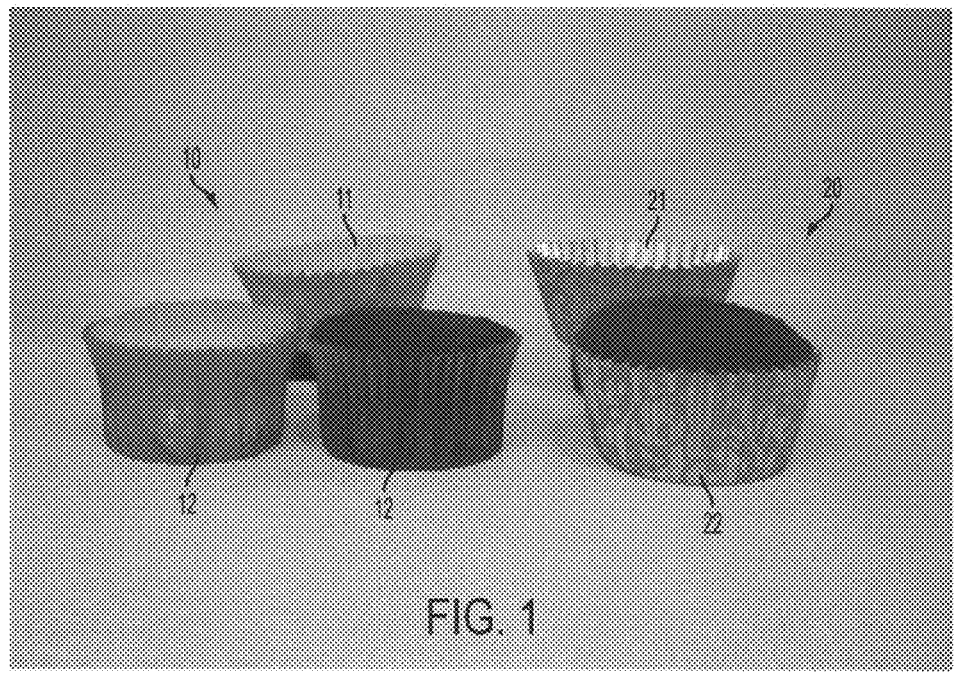
FIGS. 1, 2, and 3 illustrates a comparison of conventional baking liners and baking molds according to embodiments of the present invention before and after a baking process.

Reference will now be made in detail to the embodiments of the present invention, examples of which are illustrated in the accompanying drawings, wherein like reference numerals refer to the like elements throughout. The embodiments are described below in order to explain the present invention by referring to the figures.

As used herein, the term "semi-rigid" means a structure that maintains its shape under a normal load, e.g., supporting batter, but may be flexed upon the application of additional force. Additionally, as used herein, the term "peel-away" shall mean a structure that is easily unfolded, pulled or torn away when being separated from a substrate, similar to a paper cupcake liner that is easily pulled, unfolded or torn when being removed from a baked good.

As used herein, the phrase "baked product" means a final product that is solid which originally was a fluid, such as batter, but may also include chilled products such as gelatin, which also begins as a fluid prior to solidification. Additionally, as used herein, the phrase "individual-sized baked product" shall mean a baked product having a batter volume of between about 1 to 12 fluid ounces, and preferably 3.5 fluid ounces.

Figure 4:
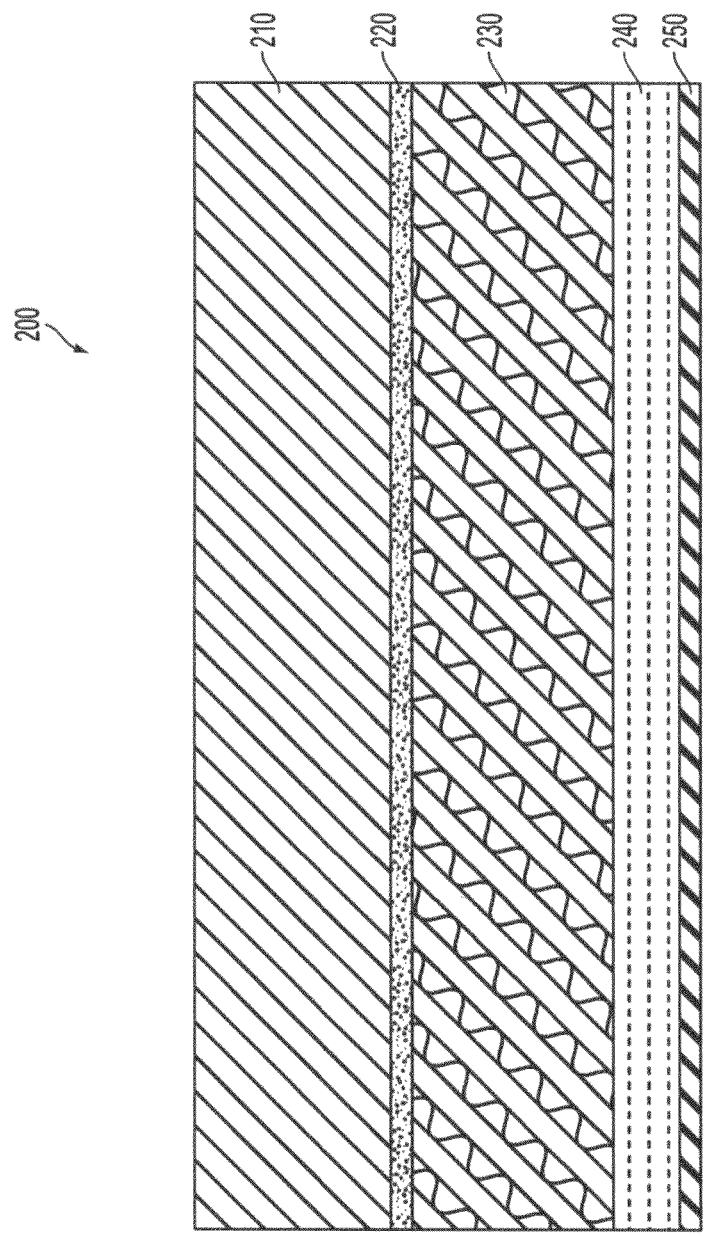
FIG. 4 illustrates a laminated baking mold material according to an embodiment of the present invention.

Referring now to the figures, FIG. 4 illustrates a laminated baking mold material [200] according to an embodiment of the present invention. As illustrated in FIG. 4, the laminated baking mold material [200] may include a food contact layer [210] laminated to an exterior layer [230].

The exterior layer [230] may form an exterior surface of the baking mold when the laminated baking mold material [200] is formed into a self-supporting baking mold or a pan-supported baking liner. The exterior layer [230] may comprise a printable material, such as paper. Other materials that can be used for the exterior layer [230] include, but are not limited to, heat resistant plastics, such as polyester or nylon. These plastic films can be surface printed, or reverse printed, then laminated to the food contact layer [210] to provide high end graphics.

The food contact layer [210] may be laminated to the exterior layer [230]. The food contact layer may comprise a material to serve as a functional barrier, such as aluminum. The FDA has recognized certain packaging materials, such as aluminum foil, as effective barriers between food and packaging components which are not approved for direct food contact. For example, the food contact layer [210] may be made from an alloy suitable for direct food contact, such as, but not limited to 8111, 8011, 1200, 1100, 1145, 1235, 3003 or other alloys and tempers of O, H19, and other suitable tempers for forming laminated baking molds. The alloy may have a temper suitable for cold forming the self-supporting baking molds or pan-supported baking liners using the laminated baking mold material [200].

The food contact layer [210] prevents moisture and/or grease from permeating through to the exterior layer [230], thus preventing degradation of an aesthetic appearance thereof. In addition, as a functional barrier, the food contact layer also prevents an ink [240] applied to the exterior layer [230] from migrating into the baked-good. In embodiments where an adhesive [220] or other substance is used to laminate the food contact layer [210] and the exterior layer [230], the food contact layer also prevents migration of the adhesive [220] or other substance into the baked product.

As described above, an adhesive [220] can be applied to either the exterior layer [230] or the food contact layer [210] to hold the layers together as a laminated baking mold material [200]. The adhesive [220] may comprise a high melting point adhesive to resist separation of the laminated baking mold material [200] during a baking process. The adhesive [220] may include a water-based acrylic, casein, or a plastic material such as polyester. Further, the adhesive [220] may also include other temperature-resistant polymers with low vapor emission, such as ethylene vinyl acetate (EVA). The adhesive [220] may be applied as water-based, solvent-based, or 100% solids-based systems. For example, when an aqueous adhesive is used, in one embodiment of the invention the adhesive may be applied as 1 lb±0.25 lb per ream (3000 sq ft). Some plastic materials used as adhesive [220] may be applied by extrusion coating. Various methods to laminate the food contact layer [210] with the exterior layer [230] are well known in the art.

Preferably, the adhesive [220] used to laminate the exterior layer [230] and the food contact layer [210] should be a non-toxic adhesive that complies with 21 CFR 175.105 and has adequate ductility and elasticity for desired lamination properties. However, because the food contact layer [210] provides a functional barrier between the baked-good and the adhesive [220], a variety of non-toxic non-food grade adhesives may be used as the adhesive [220]. Further, an amount of adhesive [220] may be increased over a conventional amount used because the food contact layer [210] provides a functional barrier between the baked-good and the adhesive [220].

As described above, an exterior surface of the exterior layer [230] may be printed with an ink [240]. The ink [240] may include any non-toxic ink used for baking liners, baking molds, and other similar applications. In addition, because the food contact layer [210] serves as a functional barrier, an amount of ink used for printing can be increased, allowing for deeper, opaque, and/or more vibrant colors.

Figure 2:
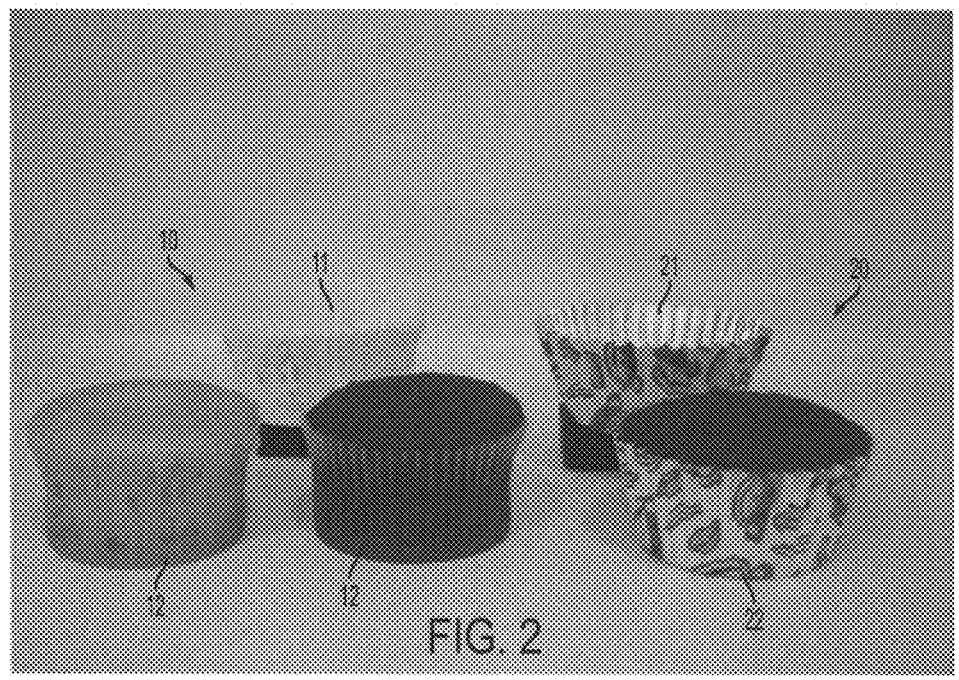
Figure 3:
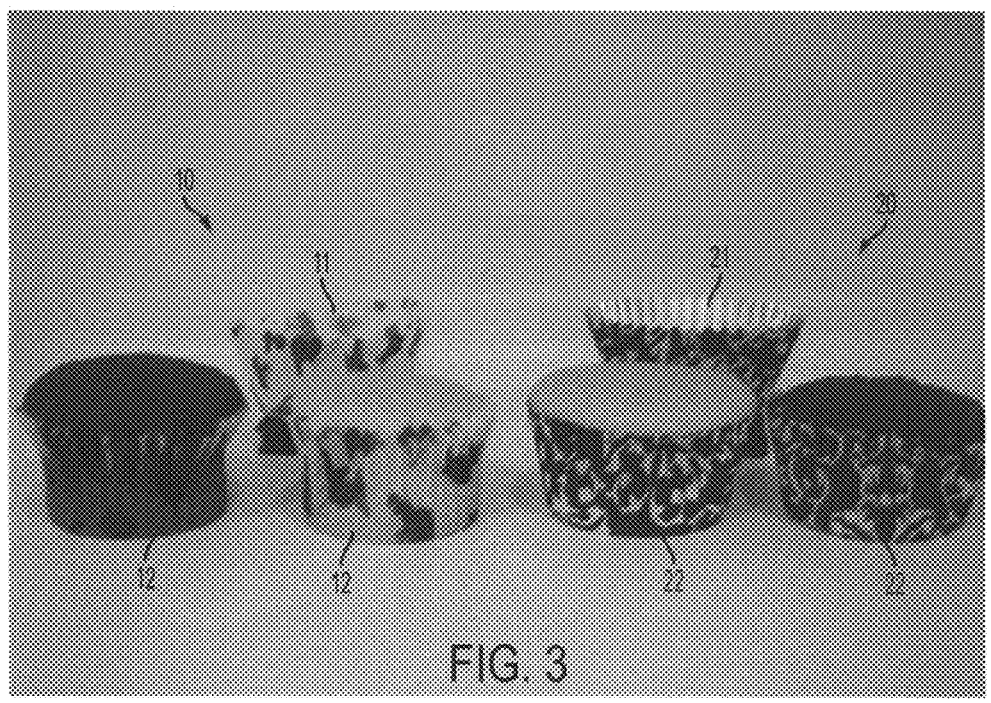

Because the food contact layer [210] prevents moisture and/or grease from permeating from the baked good to the exterior layer [230], an appearance of the baking mold or liner is not degraded during or after a baking process. The laminated baking mold material does not become translucent from moisture and/or grease from permeating from the baked good to the exterior layer [230], and colors and patterns printed on the exterior layer [230] are not affected by the color of the baked good showing through the exterior layer [230]. Accordingly, deep, opaque, and vibrant colors can be maintained before and after a baking process. As illustrated in FIGS. 1-3, the aesthetic appearance of the laminated baking mold material molds [20] is not significantly changed before [21] and after the baking process [22], in contrast to the conventional printed paper liners [10] before [11] and after [12] the baking process.

The laminated baking mold material [200] may also include a seal layer [250]. The seal layer [250] may protect the ink [240] during a baking process. The seal layer [250] may include a heat tolerant sealing wax disposed on an exterior surface of the laminated baking mold material [200]. The seal layer [250] may provide lubricity during the manufacturing process of forming the laminated baking mold material [200], such as baking cups, and helps protect the inks from scratching and being damaged. The seal layer [250] also provides minimal resistance during handling to moisture and grease that may be on the hands of the person preparing baked goods. Additionally, the seal layer [250] may prevent transfer of the ink between a plurality of self-supporting baking molds or pan-supported baking liners that are stacked together during shipping or packing.

The seal layer [250] may include a food grade heat tolerant wax, such as the various waxes cleared for either direct food contact or as a direct food additive under various regulations found within Code of Federal Regulations Title 21. Alternatively, or in addition, a paper interleaf (not shown) may also be used to facilitate separation of the stacked self-supporting baking molds or pan-supported baking liners.

The self-supporting baking molds or the pan-supported baking liners may be dimensions to nest within other self-supporting baking molds or pan-supported baking liners.

Figure 5:
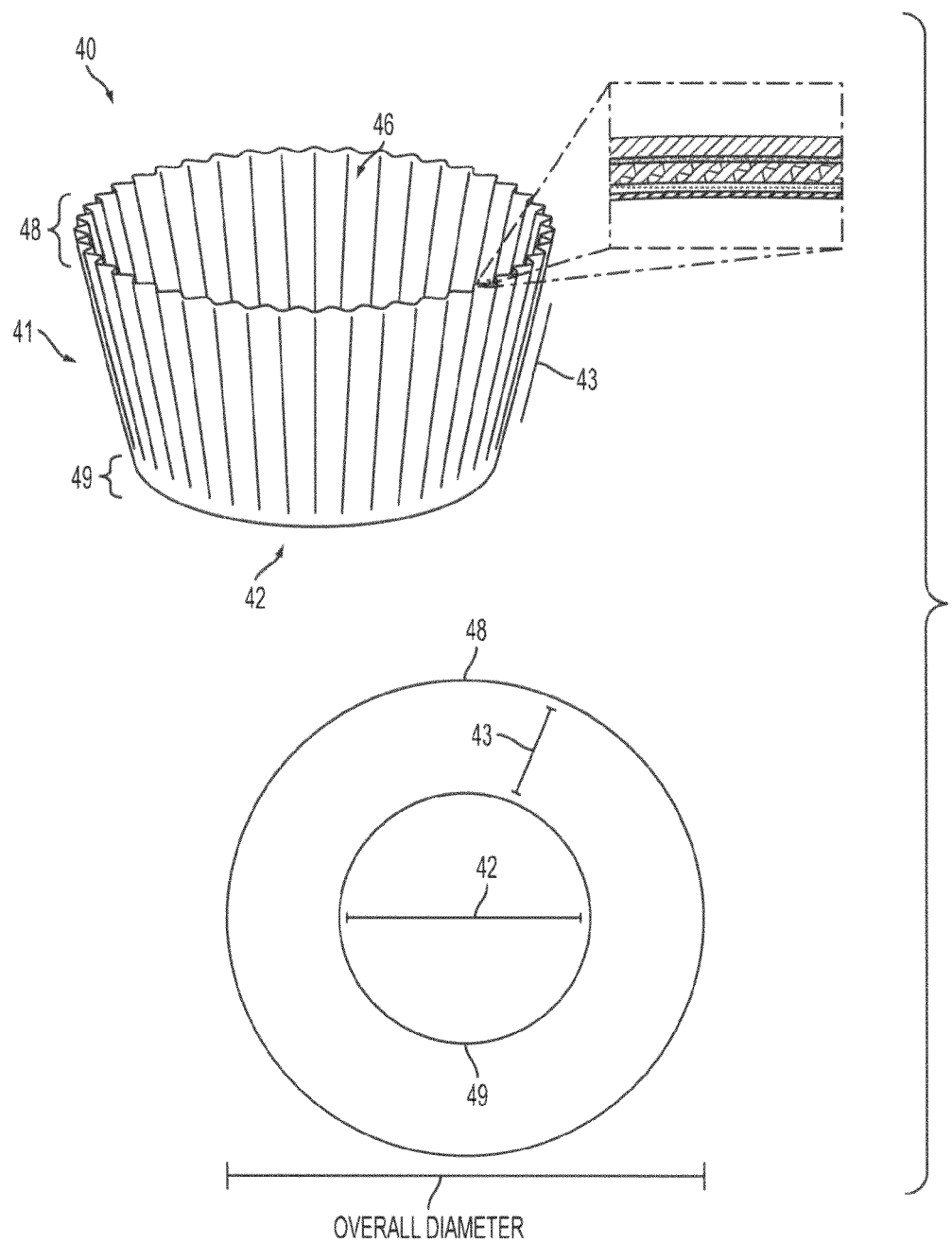
FIGS. 5 and 6 illustrate a self-supporting baking mold and a pan-supported baking liner according to embodiments of the present invention.

For example, as illustrated in FIG. 5, a self-supporting baking mold [40] may have an upper perimeter [48] that has a greater cross-sectional area than a lower perimeter [49]. With such a shape, multiple self-supporting baking molds [40] may be stacked together in a single package. As described above, a seal layer [250] may be disposed on an exterior surface of the self-supporting baking molds [40] to prevent transfer of ink between the nested self-supporting baking molds. In addition, a paper interleaf (not shown) may also be used to facilitate separation or prevent ink transfer.

The laminated baking mold material [200] used to create the self-supporting baking mold [40] may be thin enough so that the self-supporting baking mold [40] can be peeled away from the final baked product by hand. That is, in the case of self-supporting baking molds, the laminated baking mold material [200], preferably, has a thickness of between about 0.003 and 0.0045 inch, and more preferably about 0.00325 inch.

Figure 6:
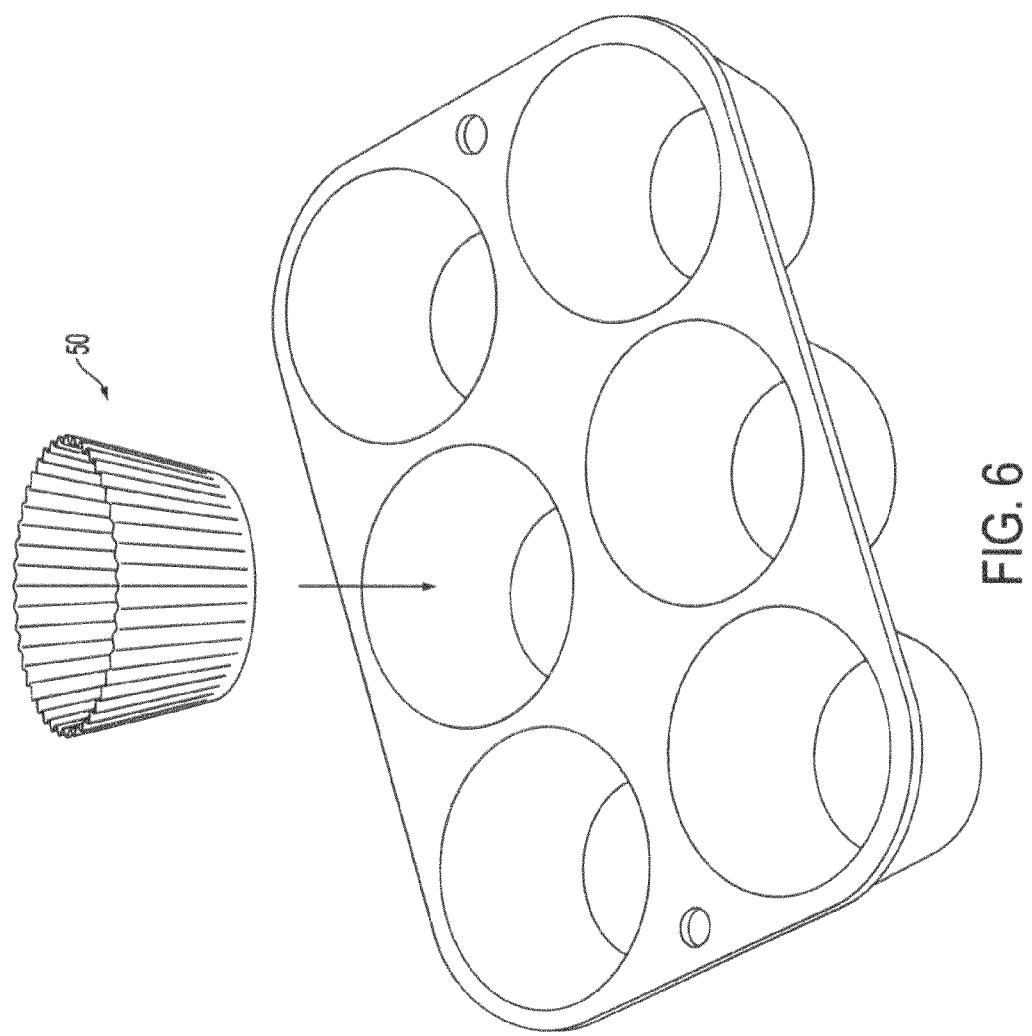

According to embodiments of the present invention, the dimensions of the laminated baking mold material [200] may be varied to correspond to a desired application. A thinner food contact layer [210] and/or exterior layer [230] may be used in pan-supported baking liner [50] applications, as illustrated in FIG. 6, while a thicker food contact layer [210] and/or an exterior layer [230] may be used for self-supporting baking mold [40] applications.

For example, a thickness of the food contact layer [210] may be 0.00025 to 0.0012 inches, and a thickness of the exterior layer [230] may be a 35 lb to a 50 lb paper, when used in a self-supporting baking mold [40]. When used in a pan-supported liner [50] application, a thickness of the food contact layer [210] may be 0.00025 to 0.00065 inches and a thickness of the exterior layer [230] may be 15 lb tissue to 30 lb paper. Generally, a thickness of the seal layer may correspond to about 3 lb to 5 lb per 3000 sq ft (ream).

Methods to laminate paper and foil, paper and plastic, and plastic and foil are well known to those skilled in the art. In a preferred embodiment, the foil and paper are combined with an aqueous adhesive, where by the adhesive is metered onto the foil first, then the paper is combined via a nip roller and sent through a drier to set the adhesive. After laminating, the combined substrate is printed. Lastly, a dry wax is applied to the printed side of the lamination.

While the laminating process described above is preferred, the present invention is not limited thereto. It should be understood that the laminated baking mold material [200] may be constructed using other known techniques or method to laminate a metal foil to a cellulose base, including heat seal, thermal bonding, and sonic sealing.

In a preferred embodiment of forming the laminated baking mold material [200] into baking cups, 18 rolls of the laminated baking mold material is drawn off unwind stands simultaneously to a punch and die machine. The combined ribbons of laminated baking mold material are cut into 4½ inch stack of circles. This stack of circles are held in place as the punch pushes the circles into a female die to form the shape and fluting. As the formed stack of circles exits the die, they enter an approximate 4 foot long heated tube that is the same diameter of the formed stack of circles. As the machine pushes new stacks into the heated tube, it moves the previous stacks through the tube. The heated section of tube is followed by a cooled section of tube, approximately 4 feet long. Formed stacks continue to move through the tube until they exit for packaging.

As illustrated in FIGS. 5-6, according to an embodiment of the present invention, a self-supporting baking mold [40] has a body [41] with a bowl-like shape having a generally planar base [42] and a sidewall [43]. The body [43] may be a unitary element formed of the laminated baking material [200], folded at the intersection of the base [42] and sidewall [43], forming a cavity [46]. The blank size can have an overall diameter of between 3 to 6 inches, and preferably about 4½ inches. The sidewall [43] has a height of between about ⅞ and 1⅞ inches, and preferably about 1¼ inches. This may also be referred to as the depth of the cavity [46]. The base [42] can have a diameter of 1¼ to 2¼ inches, and preferably about 2 inches. The cavity [46] may be sized to hold between about 1 to 12 fluid ounces, and preferably 3.5 fluid ounces, of batter or other liquid used to make a baked product. The base [42] and sidewall [43] are generally semi-rigid having enough strength to support the weight of a batter placed within the cavity [46] without significant deformation. The self-supporting shaped baking mold [40] may be printed on an exterior surface thereof with an ink. As such, the self-supporting baking mold [40] may be placed on an oven rack or cookie sheet during baking without use of a separate baking pan for support. The dimensions of the pan-supported baking liner [50] may be similar to those described above, or may be adjusted to fit within particular baking pans.

The inside cavity [46] may be coated with a lubricant to reduce any adherence between the self-supporting baking mold [40] and the baked product.

As described herein, the present invention provides a laminated baking mold material with improved printing characteristics. In addition, the laminated baking mold material provides a functional barrier to prevent the migration of ink, adhesives, or other substances into the baked product or grease and moisture from the bake product to an exterior layer of the laminated baking mold.

While the above embodiments of the invention are described with respect to self-supporting baking molds and pan-supported baking liners, it should be appreciated that the present invention is also applicable to other cooking containers where a functional barrier between the food and printed surfaces is desired, or where the permeation of grease or moisture from the food into the container needs to be prevented.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A laminated material, comprising:
   a food contact layer having an outward facing surface to directly contact a food product and an inward facing surface laminated to an exterior layer;
   said exterior layer having an inward facing surface laminated to the inward facing surface of the food contact layer and having a printed outward facing surface; and
   a seal layer disposed over the printed outward facing surface of the exterior layer,
   wherein the food contact layer consists of aluminum foil.

2. The laminated material of claim 1, wherein the aluminum foil is up to 0.00285 inches thick.

3. The laminated material of claim 2, wherein the food contact layer is between about 0.00025 and 0.0012 inch thick.

4. The laminated material of claim 1, wherein the exterior layer comprises paper.

5. The laminated material of claim 4, wherein the exterior layer comprises 35 lb paper.

6. The laminated material of claim 4, wherein the exterior layer is between about a 15 lb tissue and 50 lb paper.

7. The laminated material of claim 1, further comprising an adhesive layer disposed between the inward facing surface of the food contact layer and the inward facing surface of the exterior layer to adhesively couple the food contact layer and the exterior layer.

8. The laminated material of claim 7, wherein the adhesive layer comprises a non-toxic adhesive.

9. The laminated material of claim 7, wherein the adhesive layer comprises about 0.75 to 1.25 lb of adhesive per 3000 sq ft of laminated material.

10. The laminated material of claim 9, wherein the seal layer comprises a heat resistant wax.

11. The laminated material of claim 10, wherein the heat resistant wax is a food grade wax.

12. The laminated material of claim 10, wherein the seal layer is about 4 lb per 3000 sq ft.

13. The laminated material of claim 11, wherein the heat resistant wax is a wax cleared for direct food contact or as a direct food additive.

14. The laminated material of claim 13, wherein the food contact layer is 0.00026 inches thick, and the exterior layer is a 35 lb paper.

15. The laminated material of claim 13, wherein the food contact layer is 0.00026 inches thick, and the exterior layer is 25 lb paper.

16. The laminated material of claim 14, wherein the food contact layer prevents migration of the ink and adhesive through the food contact layer.

17. The laminated material of claim 14, wherein the food contact layer prevents at least one of moisture and grease from migrating into the exterior layer from a food product in contact with the food contact layer.

18. The laminated material of claim 15, wherein the food contact layer prevents migration of the ink and adhesive through the food contact layer.

19. The laminated material of claim 15, wherein the food contact layer prevents at least one of moisture and grease from migrating into the exterior layer from a food product in contact with the food contact layer.

20. A laminated self-supporting baking mold, comprising:
a food contact layer having an outward facing surface to directly contact a food product and an inward facing surface laminated to an exterior layer;
said exterior layer having an inward facing surface laminated to the inward facing surface of the food contact layer and having a printed outward facing surface; and
a seal layer disposed over the printed outward facing surface of the exterior layer,
wherein the food contact layer consists of aluminum foil, and
wherein, when subjected to a baking process, the exterior layer does not become significantly translucent and a color or design of the printed outward facing surface does not significantly degrade in aesthetic appearance.

21. The laminated self-supporting baking mold of claim 20, further comprising:
an adhesive layer disposed between the inward facing surface of the food contact layer and the inward facing surface of the exterior layer to adhesively couple the food contact layer and the exterior layer.

22. The laminated self-supporting baking mold of claim 21, wherein the outward facing surface of the exterior layer is printed with an ink and the seal layer is disposed over the printed outward facing surface of the exterior layer.

23. The laminated self-supporting baking mold of claim 21, wherein the food contact layer prevents migration of the ink and adhesive through the food contact layer and prevents at least one of moisture and grease from migrating into the exterior layer from food in contact with the food contact layer.

24. The laminated self-supporting baking mold of claim 23, wherein:
the food contact layer is 0.00025 to 0.0012 inches thick, and
the exterior layer is a 35-50 lb paper.

25. The laminated self-supporting baking mold of claim 23, wherein the baking mold is dimensioned to contain a food product volume of between about 1 to 12 fluid ounces.

26. The laminated self-supporting baking mold of claim 23, wherein the baking mold is dimensioned to contain a food product volume of about 3.5 fluid ounces.

27. The laminated self-supporting baking mold of claim 23, wherein:
the food contact layer is 0.00025 to 0.0012 inches thick, and
the exterior layer is a polyester or nylon film between 0.00040 and 0.00075 inches thick.

28. The laminated self-supporting baking mold of claim 27, wherein an inward facing side of the film is reverse printed and adhesively bonded to the foil, and the outward facing surface of the laminated self-supporting baking mold is the outward facing side of the film.

29. A laminated baking liner, comprising:
a food contact layer having an outward facing surface to directly contact a food product and an inward facing surface laminated to an exterior layer;
said exterior layer having an inward facing surface laminated to the inward facing surface of the food contact layer and having a printed outward facing surface; and
a seal layer disposed over the printed outward facing surface of the exterior layer,
wherein the food contact layer consists of a metal, and
wherein, when subjected to a baking process, the exterior layer does not become significantly translucent and a color or design of the printed outward facing surface does not significantly degrade in aesthetic appearance.

30. The laminated baking liner of claim 29, further comprising:
an adhesive layer disposed between the inward facing surface of the food contact layer and the inward facing surface of the exterior layer to adhesively couple the food contact layer and the exterior layer.

31. The laminated baking liner of claim 30, wherein the outward facing surface of the exterior layer is printed with an ink and the seal layer is disposed over the printed outward facing surface of the exterior layer.

32. The laminated baking liner of claim 31, wherein the food contact layer consists of aluminum foil, and the food contact layer is a functional barrier preventing migration of the ink and adhesive through the food contact layer and preventing at least one of moisture and grease from migrating into the exterior layer from food in contact with the food contact layer.

33. The laminated baking liner of claim 32, wherein:
the aluminum foil is 0.00025 to 0.00065 inches thick, and
the exterior layer is a 15 lb tissue to a 30 lb paper.

34. The laminated baking liner of claim 32, wherein the laminated baking liner is dimensioned to contain a food product volume of between about 1 to 12 fluid ounces.

35. The laminated baking liner of claim 34, wherein the laminated baking liner is dimensioned to contain a food product volume of about 3.5 fluid ounces.

36. The laminated baking liner of claim 32, wherein the exterior layer is a 0.00040 to 0.00075 inch thick polyester or nylon film.

37. The laminated baking liner of claim 36, wherein the film is reversed printed and adhesively bonded to the food contact layer.

* * * * *